Sept. 6, 1949.    R. A. CALDWELL    2,481,198
TRANSFORMER CALIBRATING APPARATUS

Filed Jan. 29, 1947    2 Sheets-Sheet 1

Inventor
Richard A. Caldwell
By Arthur Simon
Attorney

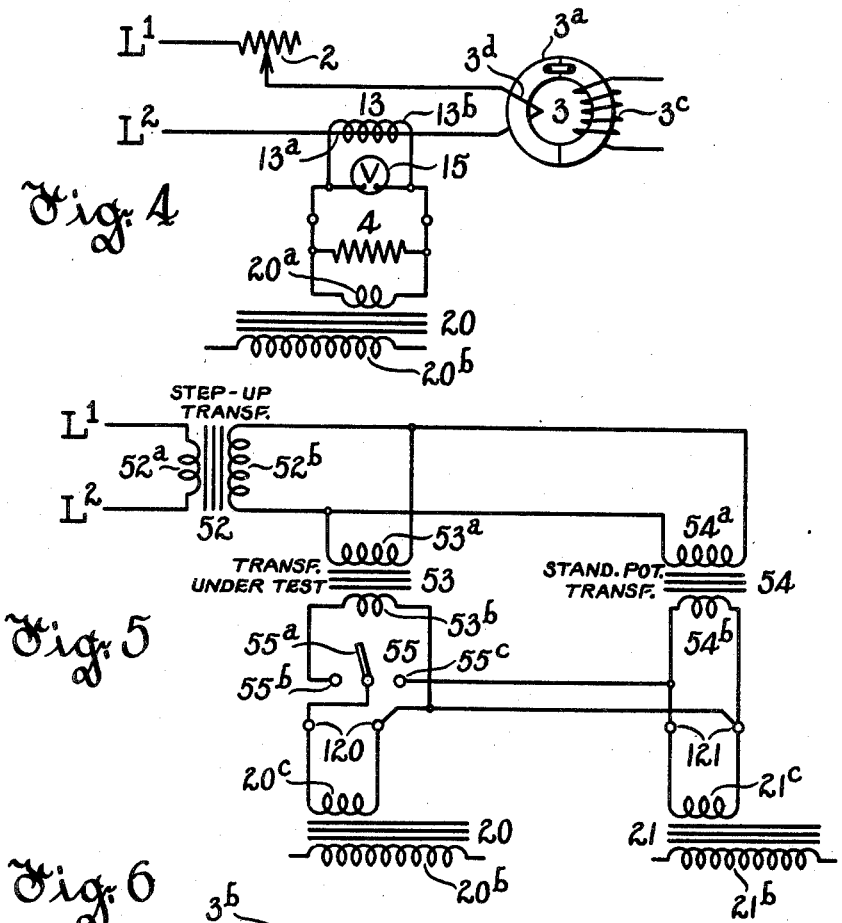

Patented Sept. 6, 1949

2,481,198

UNITED STATES PATENT OFFICE 2,481,198

TRANSFORMER CALIBRATING APPARATUS

Richard A. Caldwell, Dubuque, Iowa

Application January 29, 1947, Serial No. 725,033

6 Claims. (Cl. 175—183)

The invention relates to means for testing and calibrating instrument transformers and the like such as are employed for instance in the measurement and control of high voltages and high currents. The invention is particularly adapted for the testing of transformers of the aforementioned type employed in supply systems operating at high voltages or high currents or both.

The means which were heretofore available for the aforestated purpose employed polyphase currents for making the test and furthermore required different types of equipment for the testing of current and of voltage transformers, respectively. In addition, in the case of current transformers, the testing equipment included a standardized current transformer with which the transformer under test was compared, separate standardized transformers of corresponding current ratios being frequently required for current transformers of the different current ratios which had to be tested. The characteristics of these standardized transformers often varied as a result of residual flux from prior tests, so that the test results were not accurate. The present invention avoids this difficulty. The testing of voltage transformers introduced further complications of the apparatus.

It is common practice to periodically check the accuracy of current and voltage transformers which are installed on distribution lines and on customers premises at a distance from each other and from the central supply station. This usually requires the transportation of a quantity of testing equipment for such tests.

The transformer testing apparatus which is the subject of the present invention requires a minimum number of component parts and employs substantially the same basic testing equipment for the testing of both voltage and current transformers, except for such accessories as will be pointed out hereinafter. Thus it is not necessary to provide a separate standardized current transformer for the calibration of each of a plurality of current transformers of different current ratio which require testing. Furthermore, the test requires only a supply of single phase current. The aforementioned reduction in the amount of apparatus needed results in further simplification in the use of the invention as will hereinafter appear.

An object of the invention is to provide improved method and apparatus for testing instrument transformers.

Another object is to provide simplified methods and means for the aforementioned purpose.

Another object is to provide an instrument which is compact and easily portable.

Another object is to provide a method and apparatus of high accuracy.

Another object is to provide an apparatus which can readily be checked for accuracy.

Another object is to provide apparatus the accuracy of measurement of which is not affected by its prior use.

Another object is to provide an apparatus which requires no separate burden for use in testing current transformers.

Another object is to provide apparatus which is easily and quickly manipulated.

Other objects and advantages will hereinafter appear.

The accompanying drawings in connection with the specification are for the purpose of explaining the invention.

In the drawings,

Figs. 3 and 4 show the preferred construction of the apparatus and its connections for testing current transformers.

Fig. 5 shows certain connections for testing voltage transformers, while

Fig. 6 is a front view of the assembled apparatus.

Figure 1:
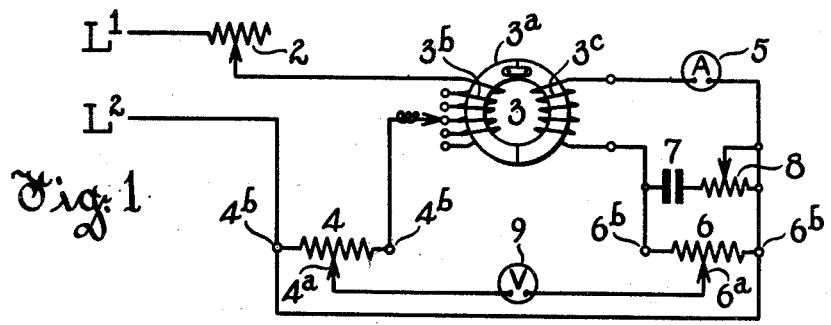
Figs. 1 and 2 are diagrams illustrating certain principles of the invention.

The invention is based on the following principle: It is well known that in an ideal transformer, that is, a transformer whose windings have no resistance and which has no magnetic leakage, the primary ampere-turns are equal to the secondary ampere-turns. In such a transformer furthermore the ratio of primary and secondary voltage is equal to the ratio of the number of turns of the primary and secondary winding. However, an actual transformer has magnetic leakage, however small, and therefore the primary and secondary ampere turns are not alike, nor holds the above stated voltage ratio.

It is possible to build a transformer which in the following shall be called a "checking" transformer, provided with a single secondary winding a plurality of selectively energizable primary windings of different number of turns so arranged as to afford essentially the same flux for a given magnetomotive force. In other words, if the currents which are passed selectively through any of the primary windings are so adjusted that in each case the primary ampere turns are the same, the secondary voltage and the secondary current and hence the secondary ampere turns are also the same as long as the impedance of the secondary load circuit remains unaltered. This statement presupposes that the resistance and leakage reactance of the primary windings may be neglected.

It is further known that if two separate voltages of like magnitude and in phase with each other are each impressed upon one of two like impedance networks, the currents in corresponding elements of the network are alike and the resulting potential differences between corresponding points of the two networks is zero. On the other hand, if there is a difference in magnitude or phase or both between the voltages impressed upon the two networks a voltage exists between corresponding points of the two networks and if two pairs of these points are connected by conductors, a current will flow therein. The magnitude and phase angle of said current depends upon the difference of the voltages and their phase displacement from each other. This difference in magnitude and phase displacement of the two voltages might be employed to calculate the difference between the impedances of the two networks. Conversely if the voltages impressed upon the two networks differ in magnitude or are displaced in phase relative to each other or both, the impedance of the two networks may be readjusted so that no current flows in conductors between selected corresponding points of the two networks and the required amount of adjustment between the two networks may be employed for determining the difference in magnitude and the phase displacement between the two voltages impressed on the networks.

The application of the foregoing principles to the testing of a current transformer in accordance with the invention will now be explained by reference to the simplified diagrams Figs. 1 and 2 of the accompanying drawing. By way of illustration let it be assumed that it is desired to determine the phase angle and ratio error of a current transformer having a rated capacity of 1000 volt-amperes, a nominal secondary current of 5 amperes for a primary current of 200 amperes, or a nominal current ratio of 40 to 1, and let it be further assumed that its ratio and phase angle errors are to be determined for a secondary load current of 5 amperes. It will be apparent that at 5 amperes the secondary voltage of said transformer must be 200 volts.

As shown in Fig. 1, I employ a "checking" transformer 3, of the aforediscussed type which is provided with a circular iron core 3a, and a primary winding 3b which has an adjustable number of turns. For a given test the adjustment is preferably such that the number of turns are equal to the nominal current ratio of the transformer to be tested in the present case 40 turns). The transformer also has a secondary winding 3c which for the present explanation is assumed to have the same number of turns. The primary winding 3b has one of its terminals connected through the regulating resistor 2, to the bus bar Ll of an alternating current supply line. The second terminal of the winding 3b is connected through a variable potentiometer resistor 4 having a movable contact 4a, to the second terminal L2 of said supply line. Connected across the terminals of the secondary winding 3c in series with an ammeter 5 is a potentiometer resistor 6 similar to resistor 4 and provided with a movable contact 6a. The resistor 6 is paralleled by a circuit comprising a capacitor 7 in series with a variable resistor 8. An indicating instrument 9 is connected between the movable contacts 4a and 6a. It will be obvious that if the transformer 3 had no losses, that is, if it were an ideal transformer and if the condenser 7 and the resistor 8 were omitted, the current flowing through the two resistors 4 and 6, respectively, would be the same so that if two corresponding end terminals of the resistors 4 and 6 are connected together, and any two other corresponding points of the two resistors are also connected together, no current flows therethrough. If therefore the two contacts 4a and 6a are connected through an instrument 9 with each other and they are arranged mechanically in such a manner that they can be moved simultaneously to cut out equivalent amounts of resistance the instrument always indicates zero current.

However, the transformer 3 has reactance and resistance and therefore the voltage induced in the secondary winding 3c of the transformer is slightly lower than and lags behind the voltage of the primary winding 3b. To compensate for the lag of the secondary voltage relative to the primary voltage is the purpose of the shunt circuit comprising the condenser 7 and the resistor 8. In order to adjust the reading of the instrument 9 to zero, the resistor 8 is varied, thereby varying the leading charging current of the condenser 7 until said charging current cancels out the magnetizing and leakage current component of the transformer 3, whereupon the currents passing through the resistors 4 and 6 are exactly in phase with each other. Furthermore, by moving the movable contacts 4a and 6a in unison with each other, that is, in opposite directions relative to the line L2 the output voltage through resistor 4 and resistor 6 and thus the potential of the contacts 4a and 6a may be adjusted so that they are equal to each other, whereupon the instrument 9 reads zero voltage. Thus the effect of the leakage and the resistance drop of the transformer 3 on the instrument 9 is balanced out, prior to making a test by the adjustments described heretofore.

It will thus be seen that the means aforedescribed provide for compensation for such losses as actually appear. If the magnitude of the secondary current is not exactly that of the primary current, it is merely necessary to move the contacts 4a and 6a relative to each other until the current in the instrument 9 is a minimum. To provide that the currents in resistors 4 and 6 are in phase with each other, a small component of the current in winding 3c is passed through the capacitor 7 and resistor 8. This current is leading the current in resistor 6 and by varying the former through adjustment of resistor 8, the phase angle between the currents through resistors 4 and 6 can be reduced to zero. It is apparent that the adjustment of resistor 8 will necessitate a slight readjustment of resistors 4 and 6, but finally the effect of transformer 3 on the two networks is balanced out, so that instrument 9 will indicate zero current flow.

Figure 2:
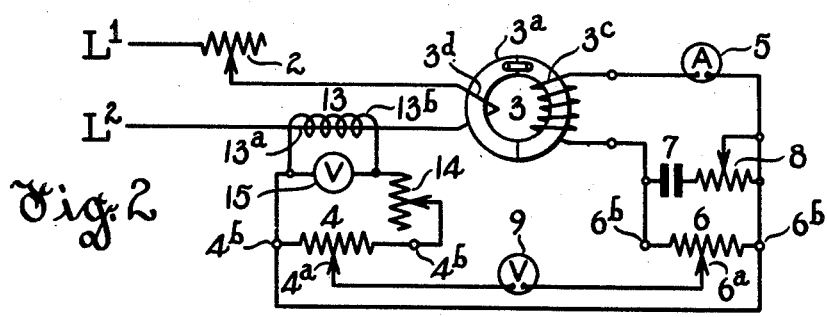

If it is now desired to determine the phase angle error and ratio error of a current transformer the checking transformer is reconnected as shown in Fig. 2 by replacing the winding 3b with a single turn winding 3d, which is connected in series with a primary winding 13a of the transformer 13 under test. The checking adjustment of resistors 4, 6, and 8 is initially left unchanged. The secondary winding 13b of the transformer under test is assumed to have a ratio of transformation of 40 to 1. The secondary winding 13b is now connected in series with a regulable impedance 14 across the terminals of the resistor 4. It will be apparent that the current which is induced in the secondary winding 13b and which passes through the resistor 4 would be equal to the current which passed through the resistor 4 with the connections as shown in Fig. 1, if the voltage at the terminals of the resistor 4 was the same in both cases, that is, if the actual ratio of transformer 13 was 40 to 1. In order to adjust this voltage to the theoretical value of a voltmeter 15 is connected temporarily across the terminals of the winding 13b and the impedance 14 is varied until the voltage as indicated by voltmeter 15, multiplied by the secondary current for which the transformer 13 is to be tested, (in the present case 5 amperes) is equal to the volt-ampere capacity of the transformer or 1000 volt-amperes. At the same time the resistor 2 is varied until the ammeter 5 indicates substantially the same current as with the connections Fig. 1. On account of the phase angle and ratio errors in transformer 13 it will now be found that the instrument 9 does not indicate zero current. To bring the instrument 9 back to zero, the movable contact 4a is moved from its former position towards the right or left, depending upon the ratio error being positive or negative, until the indication of the instrument is a minimum. Due to the phase angle error the currents in resistors 4 and 6 are now however not in phase with each other and therefore the instrument current will not become zero. In order to bring the resistor currents again in phase with each other, the movable contact of resistor 8 may be moved to vary said resistor until the instrument 9 reads zero. As the adjustment of resistors 4 and 8 affect each other, their adjustment sould be carried on simultaneously. It is apparent that the amount of adjustment required for the resistors 4 and 8 and the direction of said adjustment from their setting in the "test" position is a measure of the ratio error introduced by the transformer 13 and the same can be calculated from the constants of the network. Furthermore, the adjustment of the resistor 8 is a measure of the phase angle error of transformer 13, which can be similarly calculated.

It will be apparent from the foregoing that the system so far described requires a number of interdependent simultaneous adjustments from which the phase angle and ratio errors of the transformer under test may subsequently be calculated. It will be noted from the above and as shown in the simplified diagrams of Figs. 1 and 2 that adjustment of resistor 8 changes the parallel secondary impedance of the winding 3c. This is avoided in the instrument as actually built.

The measuring set as actually constructed therefore provides means for overcoming the aforementioned disadvantages and further provides for a reliable indication of the necessary adjustments by which the errors of the transformer under test can be determined.

Figure 3:
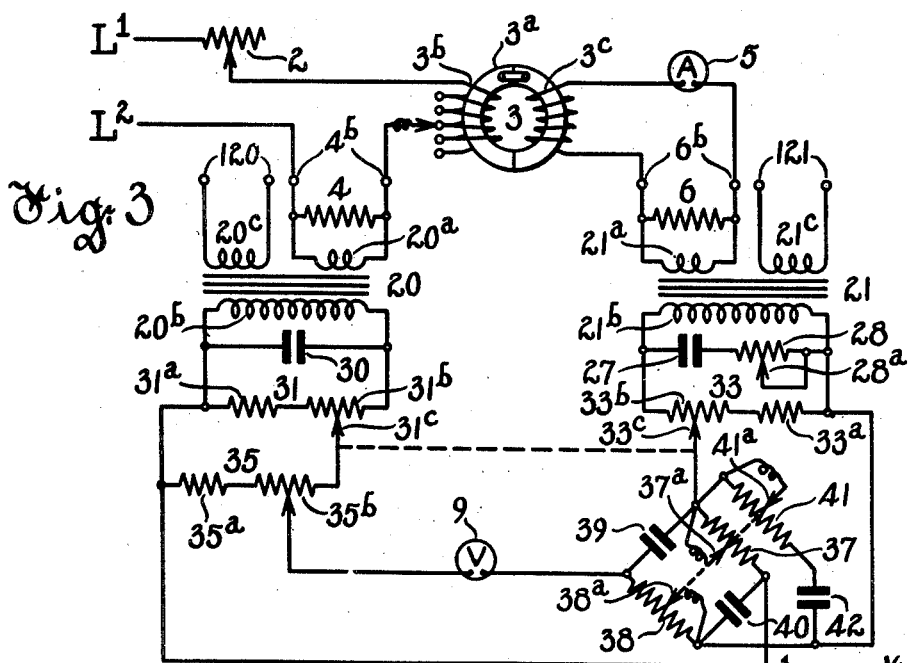

Referring to Figs. 3 and 4, the resistors 4 and 6 are permanently connected to terminals to which the primary windings 3b or 3d and the secondary winding 3c, respectively, are connected. The two resistors 4 and 6 have equal fixed ohmic values. Connected in parallel with the resistor 4 is the primary winding 20a of a transformer 20 which also has a secondary winding 20b. Connected in parallel with the resistor 6 is the primary winding 21a of a transformer 21 which has a secondary winding 21b. The transformers 20 and 21 are in all respects identical. In addition to the primary windings 20a and 21a, the transformers 20 and 21 are also provided with primary windings 20c and 21c, respectively, the purpose of which will be explained hereafter. Connected across the secondary winding 21b is a fixed condenser 27 in series with a variable resistor 28 to take the place of condenser 7 and resistor 8 of Fig. 1. A condenser 30 which has the same capacitance as the condenser 27 is connected across the secondary winding 20b. Also connected across the secondary winding 20b is a potentiometer resistor 31 comprising a fixed resistor 31a in series with a variable resistor 31b, having a movable contact 31c. Similar potentiometer resistor 33, comprising the fixed resistor 33a and the variable resistor 33b, is connected across the secondary winding 21b. Another potentiometer resistor 35 comprising a fixed resistor 35a connected in series with a variable resistor 35b is connected across the potentiometer 31. A phase shifting Wheatstone bridge which comprises the variable resistors 37 and 38 forming two opposed branches of the bridges and the condensers 39 and 40 forming the other two branches is connected through two diagonally opposed nodes across the potentiometer 33 while through the other two nodes it is connected across the potentiometer 35. The current indicating instrument 9 is inserted into the last named connection. The movable contacts 31c and 33c of the potentiometers 31 and 33, respectively, are mechanically connected so that they may be moved in unison.

The movable contacts 37a and 38a of the resistors 37 and 38, respectively, are mechanically connected to move as a unit, but are insulated from each other. They are arranged for varying simultaneously the amount of resistance inserted in the respective branches of the bridge by equal amounts. There is also connected across the potentiometer 33, a variable resistor 41 in series with a fixed condenser 42. The movable contact 41a of the resistor 41 is mechanically attached to the operating arm for the movable contacts 37a and 38a, but is electrically insulated therefrom. Resistor 41 and capacitor 42 are so proportioned that they compensate for the variation of the impedance in circuit with the secondary winding 3c due to variations in the adjustment of the bridge resistors 37 and 38.

To check the equipment it is connected in accordance with Fig. 3. The checking transformer is provided with a primary winding 3b which is equal to the nominal current ratio of the transformer to be tested. The movable contacts of the potentiometer 35 and of resistors 37, 38, 35b and 41, are set to their mid position and the resistor 2 is adjusted to pass through winding 3b a current which is equal to the primary current at which the transformer under test is to be calibrated, divided by its turn ratio. Thereafter the potentiometer 31 and 33 and resistor 28 are adjusted until the instrument 9 indicates zero current. It will be apparent that adjustment of the current which flows through the condenser 27 and the resistor 28 compensates for the inductive drop between the windings 3b and 3c of the transformer 3 and also for any unbalance due to differences in the inductive drop of transformers 20 and 21.

With the instrument thus adjusted the primary winding 3b is disconnected and the primary winding 3d is substituted therefore and connected in series with the primary winding 13a of the transformer under test, while the secondary winding 13b of said transformer is connected across the resistor 4 as shown in Fig. 4. The resistor 2 is then adjusted so that the secondary current in the winding 13b as indicated by the instrument 5 is equivalent to the nominal primary current at which the transformer 13 is to be tested. It will then be found that the voltages which are impressed on the secondary windings 20b and 21b, respectively, are not the same as they were for the checking connections, the difference being due to the voltage and phase angle errors of the transformer 13. In order to correct for such error the adjustment of the potentiometer 35 and of the resistors 37, 38 and 41 is changed, until the instrument 9 again indicates zero current. The adjustment of the potentiometer 35b varies the voltage impressed upon the indicating instrument in accordance with the change in the difference of the voltages of the transformer windings 20b and 21b. As the voltage impressed upon the winding 21b is the same and the ratio of transformer 20 is also the same as they were for checking in accordance with Fig. 3, any change affecting the instrument 9 is due to an error in the voltage ratio of the transformer 13b. By calibrating the potentiometer 35 the voltage ratio error of the transformer under test is readily calculated. On the other hand, if there is a phase angle error in the transformer 13, the voltage induced in the winding 21b differs in phase from the voltage induced in the winding 20b. This is corrected by changing the resistors 37, 38 and 41, which changes the phase position of its output voltage, but not the magnitude of said voltage, which voltage is opposed to the output voltage of the potentiometer 35. If the two voltages are equal to and in phase with each other the instrument 9 reads zero current. The phase angle error of the transformer under test can thus be calculated from the adjustment required on the Wheatstone bridge.

It will thus be seen that by a simple manipulation of the potentiometer 35 and the Wheatstone bridge the phase angle and current ratio error of the transformer can be determined.

In practice it may be desirable to provide for greater sensitivity of the instrument by substituting for the instrument 9, the input circuit of an amplifier, such as an electronic amplifying system of any well known suitable type. This system may be made sensitive to phase position of the detected voltage thus simplifying and facilitating adjustment. In this manner differential voltages of very small magnitude can be amplified and indicated so as to enable the operator to determine the errors in the transformer under test to a very high degree of accuracy.

The transformers 20 and 21 were described as having each a primary winding 20a and 21a, respectively, under certain conditions, i. e. for testing current transformers having different full load secondary currents, it may be desirable to provide said transformer with additional primary windings or with different primary winding taps affording different twin ratios, so as to further facilitate the manipulation and extend the range of use of the instrument.

The apparatus described may also be used for testing and calibrating potential transformers. For this purpose it is necessary to provide a standard potential transformer, the phase angle and ratio error of which is known and compare this standard transformer with the transformer to be calibrated. The method of procedure will now be explained in connection with the diagram, Fig. 5. To make the test it is necessary to provide a standard potential transformer, the transformer to be tested and a source of high voltage equal to the nominal high voltage of the transformer under test such for instance as a step up transformer 52, having a low voltage winding 52a, which is supplied with energy from a suitable source and a high tension winding 52b, the output voltage of which is equal to the nominal voltage of the transformer to be calibrated. Connected in parallel with the high tension winding 52b, is the high tension winding 53a of the transformer under test, and also the high tension winding 54a of the standard potential transformer. One terminal of the low tension winding 53b of the transformer 53 is connected to one stationary contact 55b of a double throw switch 55 which has also a stationary contact 55c and a cooperative movable contact blade 55a. The low tension winding 54b of the transformer 54 is connected to a primary winding 21c of the transformer 21. One terminal of the winding 54b is also connected to the contact 55c, while the other terminal of the winding 54b is also connected to one terminal of the primary winding 20c. The windings 20c and 21c have the same number of turns. The second terminal of winding 20c is connected to the contact blade 55a of the double throw switch 55. All other connections of the instrument are the same as shown and described in connection with Fig. 3.

To test an instrument transformer the movable contact 55a of the double throw switch 55 is thrown to the right so that both transformer windings 20c and 21c are connected in parallel with the secondary winding 54b of the transformer 54. In this position the movable potentiometer contacts 31c and 33c are jointly adjusted and also the movable contact 28b in the same manner as aforedescribed, to afford minimum deflection of the instrument 9. Thereafter the switch blade 55a is thrown to the left so that the current of the secondary winding 53b passes through the winding 20c and 21c. If the transformer under test 53 differs from the standard transformer 54 the instrument 9 will now show a different deflection. This deflection is again reduced to a minimum by adjustment of the potentiometer 35 and the Wheatstone bridge in the manner aforedescribed, whereupon the difference between the phase angle error and the difference between the voltage ratio of the transformer under test and the standard transformer can be determined from the difference in adjustment as has been described heretofore, the difference in readings indicating of course the difference between the phase angle error and ratio error of the transformer under test and the standard potential transformer. By comparing the known errors of the standard transformer with the difference of errors between the standard transformer and the transformer under test, the total errors of the transformer under test may be calculated. Thus the invention provides a single instrument whereby the phase angle error and ratio error of both current and potential transformers can be readily ascertained.

Fig. 6 shows how the instrument may be assembled for convenient use and transportation. All of the stationary parts of the equipment are assembled in a box 101, provided with a suitable front cover on which the various indicators are mounted. The winding 3b is in the shape of a handle partly protruding through the top of the instrument case, and the various taps of the winding 3b are connected to a suitable dial 3c so that contact can be made to the various taps by rotating the dial in the usual manner. Near the upper edge of the panel 102 are the binding posts 4b and 6b of the resistors 4 and 6, respectively, and also the terminals 120 and 121 of the windings 20c and 21c, respectively. The instruments 5 and 15 are also mounted on the front panel, the instrument 5 being permanently connected as shown in diagram, Fig. 3, while the instrument 15 is preferably connected to terminals 151 by means of which it can be connected through suitable leads to the winding 13a. The dial 31b has an operating handle which is connected with the potentiometer contacts 31c and 33c to operate the same in unison, while the dial 128b is connected to the movable contact 28a of the potentiometer resistor 28. The dial 135 is connected to the movable contact of the potentiometer 35, while the dial 38 is connected to the movable contacts 37a, 38a and 41a, which as explained heretofore are operated in unison. The panel 102 also has mounted thereon terminals 152 for connection to the lines L1, L2, of the power supply and a terminal 153 for connection to a suitable ground. The instrument box may also contain a suitable amplifier, the indicator of which corresponding to the instrument 9 of Fig. 3, is indicated by the numeral 139. A switch 154 may be employed to control the heating current of amplifying tubes which may be employed and which may form a part of the amplifier.

It will be apparent that inasmuch as the results of the tests with the instrument depend primarily upon the ratios of certain impedances to each other, these results are substantially independent of minor variations due to the prior use of the apparatus, such as are encountered when transformer or inductances are employed as permanent reference standards.

It should also be noted that the effect of higher harmonics in the voltages of the current supply for the test are substantially cancelled for reasons which are obvious to those skilled in the art.

The method and apparatus described herein are subject to further modifications obvious to those skilled in the art and coming within the scope of the appended claims.

For instance it will be apparent that the transformers 20 and 21 shown in Fig. 3 may be omitted and the resistors 4 and 6 of suitable value may be directly connected into the respective circuit in place of the transformer windings 20b and 21b, respectively.

What I claim as new and desire to secure by Letters Patent is:

1. Testing equipment for calibrating instrument transformers and the like, comprising, a checking transformer having a closed ferromagnetic core, a primary and a secondary winding inductively arranged on said core, a tertiary inducing winding for said checking transformer, a primary potentiometer resistor, a secondary potentiometer resistor having its resistor element connected across said secondary winding of said checking transformer, connecting means arranged for the connection of the resistor element of said primary potentiometer in series with said primary winding and with a source of alternating current and alternatively for the connection of said tertiary winding and said source of current in series with the primary winding of the instrument transformer to be calibrated, and connecting means arranged for the connection of the secondary winding of said instrument transformer in series with the resistor element of said primary potentiometer without disturbing the connections of said secondary potentiometer, and means coacting with said potentiometers for determining the relation to each other of the voltages impressed upon said potentiometers for each of said two alternative connections, whereby the difference in said relations for said alternative connections affords a measure of the current ratio and phase angle of said instrument transformer.

2. Testing equipment for calibrating instrument transformers and the like, comprising, a checking transformer having a closed ferromagnetic core, a primary and a secondary winding inductively arranged on said core, a tertiary inducing winding for said checking transformer, a primary potentiometer resistor, a secondary potentiometer resistor having its resistor element connected across said secondary winding of said checking transformer, connecting means arranged for the connection of the resistor element of said primary potentiometer in series with said primary winding and with a source of alternating current and alternatively for the connection of said tertiary winding to said source of current in series with the primary winding of the instrument transformer to be calibrated, connecting means arranged for the connection of the secondary winding of said instrument transformer in series with the resistor element of said primary potentiometer without disturbing the connections of said secondary potentiometer, and adjusting means for balancing the voltages from said potentiometers against each other for either connection of said primary potentiometer, whereby the difference in adjustment of said potentiometers for the two conditions affords a measure of the current ratio and phase angle of the transformer under test.

3. Testing equipment for calibrating instrument transformers and the like, comprising, a checking transformer having a closed ferromagnetic core, a variable turn primary winding and a secondary winding inductively arranged on said core, a tertiary inducing winding for said checking transformer, means to adjust the ratio between the turns of said primary and the turns of said secondary winding to correspond to the nominal ratio of transformation of the transformer to be calibrated, a primary potentiometer resistor, a secondary potentiometer resistor having its resistor element connected across said secondary winding of said checking transformer, connecting means arranged for the connection of the resistor element of said primary potentiometer in series with said primary winding and with a source of alternating current, and alternatively arranged for the connection of said tertiary winding to said source of current in series with the primary winding of the instrument transformer to be calibrated, connecting means arranged for the connecting of the secondary winding of said instrument transformer in series with the resistor element of said primary potentiometer, and adjusting means for balancing the voltages from said potentiometers against each other for either connection of said primary potentiometer, whereby the difference in adjustment of said potentiometers for the two conditions affords a measure of the current ratio and phase angle of the transformer under test.

4. Testing equipment for calibrating instrument transformers and the like, comprising, a checking transformer having a closed ferromagnetic core, a variable turn primary winding and a secondary winding inductively arranged on said core, a tertiary inducing winding for said checking transformer, means to adjust the ratio between the turns of said primary and the turns of said secondary winding to equal the nominal ratio of transformation of the transformer to be calibrated, a primary potentiometer resistor, a secondary potentiometer resistor having its resistor element connected across said secondary winding of said checking transformer, connecting means arranged for the connection of the resistor element of said primary potentiometer in series with said primary winding and with a source of alternating current, said core being split and being arranged for the substitution of said tertiary winding for said primary winding and said connecting means being alternatively arranged for the connection of said tertiary winding to said source of current in series with the primary winding of the instrument transformer to be calibrated, connecting means arranged for the connection of the secondary winding of said instrument transformer in series with the resistor element of said primary potentiometer, and adjusting means for balancing the voltages from said potentiometers against each other for either connection of said primary potentiometer, whereby the difference in adjustment of said potentiometers for the two conditions of balance affords a measure of the current ratio and phase angle of the transformer under test.

5. Testing equipment for calibrating instrument transformers and the like, comprising, a checking transformer having a closed ferromagnetic core, a variable turn primary winding and a secondary winding inductively arranged on said core, a tertiary inducing winding for said checking transformer, means to adjust the ratio between the turns of said primary and the turns of said secondary winding to correspond to the nominal ratio of transformation of the transformer to be calibrated, a primary potentiometer resistor, a secondary potentiometer resistor having its resistor element connected across said secondary winding of said checking transformer, connecting means arranged for the connection of said resistor element of said primary potentiometer in series with said primary winding and with a source of alternating current, and alternatively arranged for the connection of said tertiary winding to said source of current in series with the primary winding of the instrument transformer to be calibrated, connecting means arranged for the connection of the secondary winding of said instrument transformer in series with the resistor element of said primary potentiometer, and adjusting means for balancing the voltages from said potentiometers against each other for either connection of said primary potentiometer, said last named means including phase angle shifting means for causing the said voltages to have the same phase angle, whereby the difference in adjustment of said potentiometers for the two conditions of balance affords a measure of the current ratio and phase angle of the transformer under test.

6. Testing equipment for calibrating instrument transformers and the like, comprising, a checking transformer having a closed ferromagnetic core, a variable turn primary winding and a secondary winding inductively arranged on said core, a tertiary inducing winding for said checking transformer, means to adjust the ratio between the turns of said primary and the turns of said secondary winding to correspond to the nominal ratio of transformation of the transformer to be calibrated, a primary potentiometer resistor, a secondary potentiometer resistor having its resistor element connected across said secondary winding of said checking transformer, connecting means arranged for the connection of said resistor element of said primary potentiometer in series with said primary winding and with a source of alternating current, and alternatively arranged for the connection of said tertiary winding to said source of current in series with the primary winding of the instrument transformer to be calibrated, connecting means arranged for the connection of the secondary winding of said instrument transformer in series with the resistor element of said primary potentiometer, and adjusting means for balancing the voltages from said potentiometers against each other for either connection of said primary potentiometer, said last named means including a bridge circuit having substantially constant impedance and comprising a pair of like resistors simultaneously variable by equal amounts and forming two opposite sides of a four conductor mesh, a pair of like condensers forming the other two sides of said mesh, a condenser and a variable resistor connected in series wtih each other between diagonally opposed nodes of said mesh, and means for varying said resistors simultaneously by proportional amounts, said last mentioned diagonally opposed nodes being connected to opposed points of said secondary potentiometer resistor and the other two diagonally opposed nodes being connected to opposed points of said primary potentiometer, whereby the difference in adjustment of said potentiometers for the two conditions of balance affords a measure of the current ratio and phase angle of the transformer under test.

RICHARD A. CALDWELL.

REFERENCES CITED

The following references are of record in the file of this patent:

UNITED STATES PATENTS

| Number | Name | Date |
| --- | --- | --- |
| 1,588,539 | Fortescue | June 15, 1926 |
| 1,707,773 | Sarfert | Apr. 2, 1929 |
| 1,972,243 | Nolke | Sept. 4, 1934 |
| 2,042,234 | Lyle | May 26, 1936 |

FOREIGN PATENTS

| Number | Country | Date |
| --- | --- | --- |
| 746,420 | France | Mar. 29, 1933 |

OTHER REFERENCES

Publication in Journal of Scientific Instruments for March 1945, pages 55 and 56.